United States Patent [19]

Babbs

[11] Patent Number: 5,020,853
[45] Date of Patent: Jun. 4, 1991

[54] VEHICLE SEAT SLIDE MECHANISM

[75] Inventor: Frederick W. Babbs, Nottingham, England

[73] Assignee: Dunlop Cox Limited, United Kingdom

[21] Appl. No.: 559,069

[22] Filed: Jul. 30, 1990

[30] Foreign Application Priority Data

Aug. 2, 1989 [GB] United Kingdom ............... 8917633

[51] Int. Cl.⁵ .............................................. B60N 1/04
[52] U.S. Cl. .................................................. 297/341
[58] Field of Search ............... 297/341; 248/393, 419, 248/424, 430

[56] References Cited

U.S. PATENT DOCUMENTS

| | | | |
|---|---|---|---|
| 3,940,182 | 2/1976 | Tamura | 297/341 |
| 4,065,178 | 12/1977 | Carella et al. | 297/341 |
| 4,101,169 | 7/1978 | Muraishi et al. | 297/341 |
| 4,143,911 | 3/1979 | Sakakibara et al. | 297/341 |
| 4,159,147 | 6/1979 | Kiyomitsu et al. | 297/341 |
| 4,422,690 | 12/1983 | Kopich | 297/341 |
| 4,440,442 | 4/1984 | Drouillard et al. | 297/341 |
| 4,449,752 | 5/1984 | Yasumatsu et al. | 297/341 |

Primary Examiner—Peter A. Aschenbrenner
Attorney, Agent, or Firm—Stevens, Davis, Miller & Mosher

[57] ABSTRACT

A vehicle seat slide mechanism comprises a fixed slide and a movable slide allowing fore-and-aft adjustment of the vehicle seat position. The mechanism includes a memory mounted on the fixed slide which enables the seat to be returned to its original position. Preferably this is actuated by tilting the squab of the seat and is particularly suitable for two-door cars wherein the front seat has to be slid forwards to allow access to the rear.

8 Claims, 6 Drawing Sheets

VEHICLE SEAT SLIDE MECHANISM

The invention relates to a vehicle seat slide mechanism and is concerned with so-called vehicle seat slide pairs.

Vehicle seat slide mechanisms, such as are provided for the fore-and-aft adjustment of the seats of a motor car or other types of vehicle, comprise a first slide member arranged to be fixed to the floor of the vehicle and a second slide member arranged to be attached to the body of the vehicle seat and slidably retained with respect to the first slide member. The combination of such a first and second slide member is referred to as a vehicle seat slide pair and it is usual to provide two such pairs, one pair on each side of the seat to make a vehicle seat slide mechanism.

In order to restrain undesired fore-and-aft movement of a vehicle seat it is usual to provide a plurality of apertures or notches in the fixed slide member, which are selectively engaged by a trigger or locking member connected to the movable slide member. The trigger member normally engages in one or more of the apertures and positively prevents relative sliding movement. A release handle connected to the trigger members of a sliding mechanism may be actuated to withdraw the trigger members from their respective apertures in the slide pairs to permit sliding movement of the vehicle seat whereafter the trigger members are re-engaged with different apertures.

If a vehicle seat is moved, e.g. forwardly, it is often desired then to return precisely to its original position. This is particularly the case in two-door cars in which it is usual to tilt the squab of the front seat forwards and then to slide the seat forward to the maximum possible extent in order to permit access to the rear seats. It is inconvenient for the user of the front seat subsequently to have to adjust the position of the seat until it is in the optimum position because this can be relatively time consuming and is an operation which may have to be performed several times during a single journey. There is therefore a need for a seat position memory system which, when the seat is being slid rearwardly, will act automatically to lock the seat in the position which it originally occupied as soon as that position is reached without the user necessarily even knowing that that position has been reached.

Such a seat position memory system is disclosed in FR-A-2449549. In this system, when the squab is tilted forwards locking triggers are released and when the seat is then slid forwards a memory block is left locked in position on a notched rail by a secondary trigger. When the seat is moved rearwardly, the memory block is struck by a striker pin and the locking triggers are released thereby relocking the seat in its original position.

However, this system is extremely complex, particularly because it incorporates two separate trigger systems, and it is therefore an object of the present invention to provide a seat position memory system which is simple and thus cheaper and more reliable than the known system.

According to the present invention a vehicle seat slide mechanism comprises two seat slide pairs, each comprising a first elongate slide member adapted to be connected to the floor of the vehicle and a second elongate slide member adapted to be connected to the body of the vehicle seat and in sliding relationship with the first member the second slide member having a trigger member mounted thereon and normally urged by a spring into a locked position where it is in engagement with at least one of a series of apertures or notches in the first slide member to prevent relative sliding movement of the two slide members, and a release member co-operating with the two trigger members and arranged to move each of the two trigger members from the locked position to an unlocked position where each is out of said engagement with the at least one aperture or notch in the first slide member, characterised in that the vehicle seat mechanism further comprises a memory member carried by the first slide member and movable parallel thereto by engagement with one of first and second engagement members connected to the second slide member; a coupling member linked to the release member and to a forwardly tiltable lever such that when the lever is tilted forwardly the release member is operated to move the trigger members to the unlocked position, the coupling member having associated therewith an actuator which co-operates with the first engagement member on said forward tilting of the lever to move the member out of engagement with the memory member which thus remains stationary as the seat is moved forwardly; and a locking member which co-operates with the memory member and is so constructed and arranged that when the seat is moved forwardly and the memory member remains stationary, the locking member moves to a position where it co-operates with the actuator whereby when the lever is returned to its untilted position the coupling member is prevented from returning to a position in which each trigger member may return to the locked position, but when the seat is moved rearwardly the locking member engages the memory member and returns to its original position thereby permitting the coupling member to return to its original position whereafter each trigger member returns to the locked position thus locking the seat in its original position.

Preferably when the lever, which may be the seat squab, is returned to its untilted position and the seat is moved rearwardly the second engagement member also returns to its original position in engagement with the memory member.

The memory member may comprise a block frictionally engaged with a rail arranged parallel to the first slide member and the coupling member may comprise a cable having one end attached to the lever. It may be passed around a pulley connected to the release members and have its other end attached to the slide member.

Further features and details of the invention will be apparent from the following description of two specific embodiments, which are given by way of example only, with reference to the accompanying drawings, in which.

Figure 1:
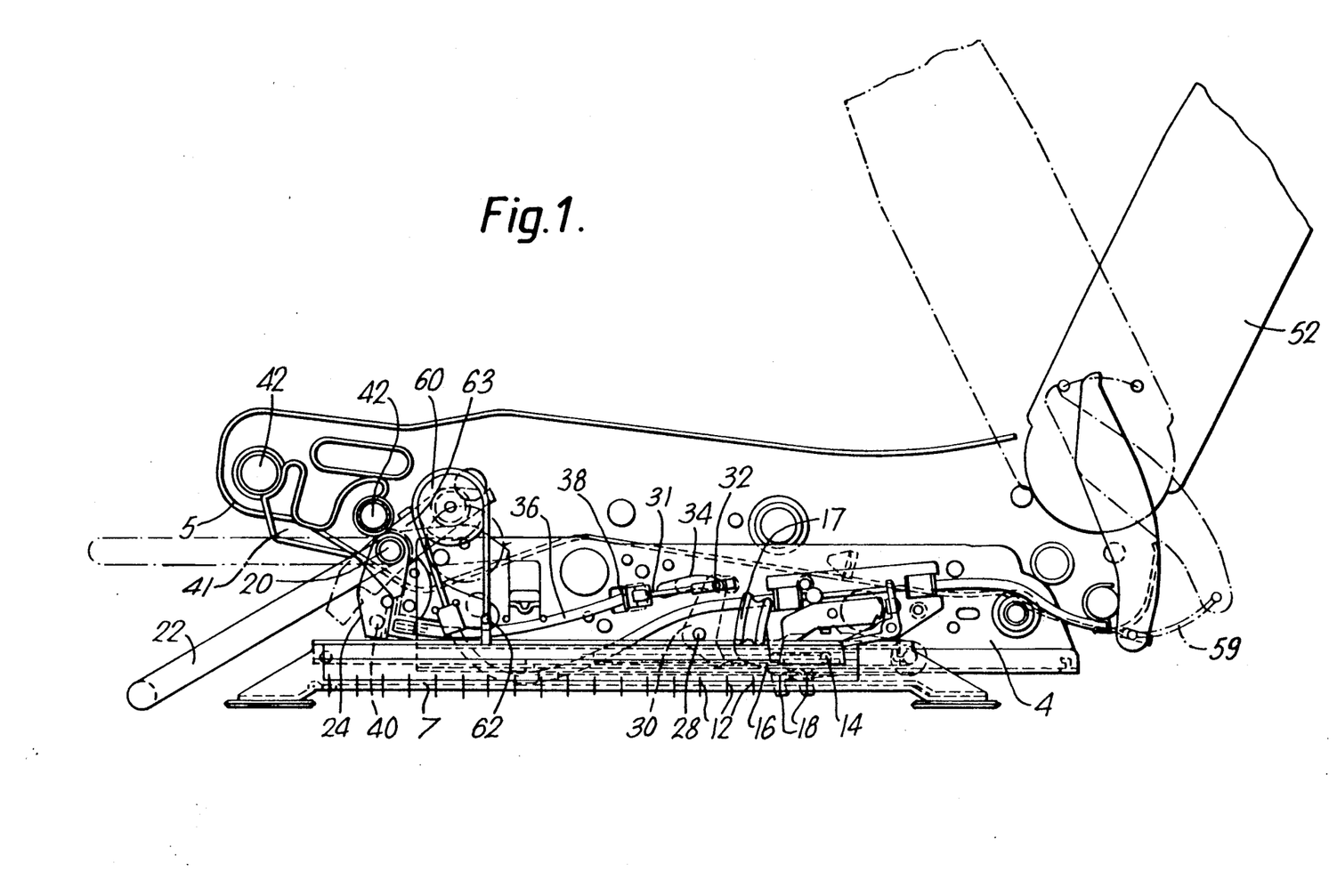
FIG. 1 is a side view of a slide pair forming part of a vehicle seat slide mechanism in accordance with the first embodiment of the invention.
Figure 2:
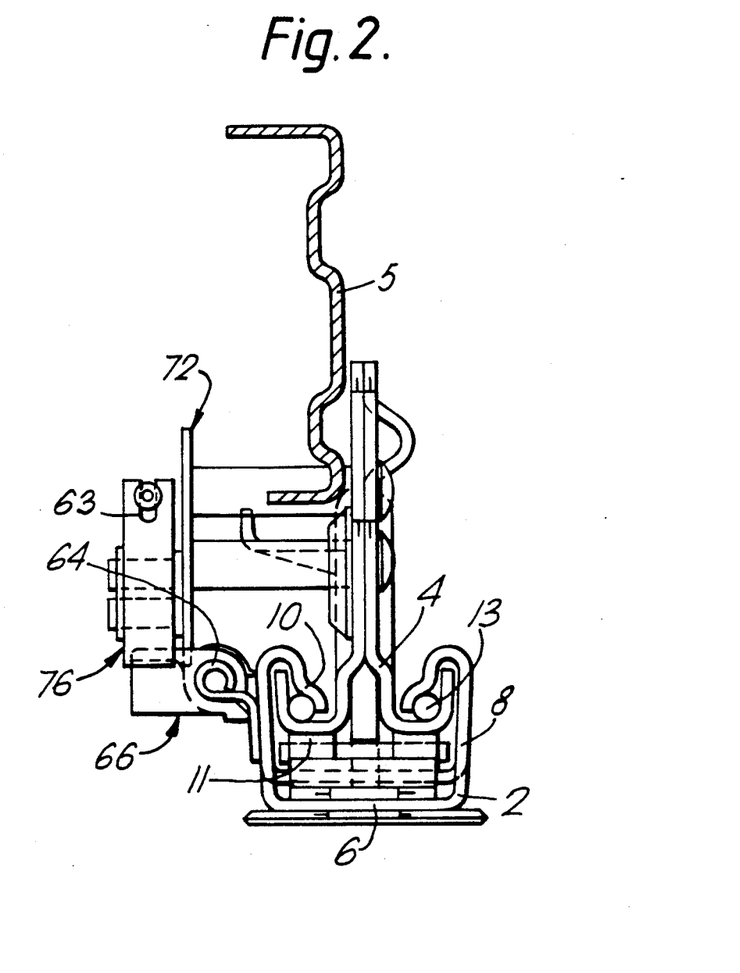
FIG. 2 is a transverse sectional view of the slide pair of FIG. 1.
Figure 3:
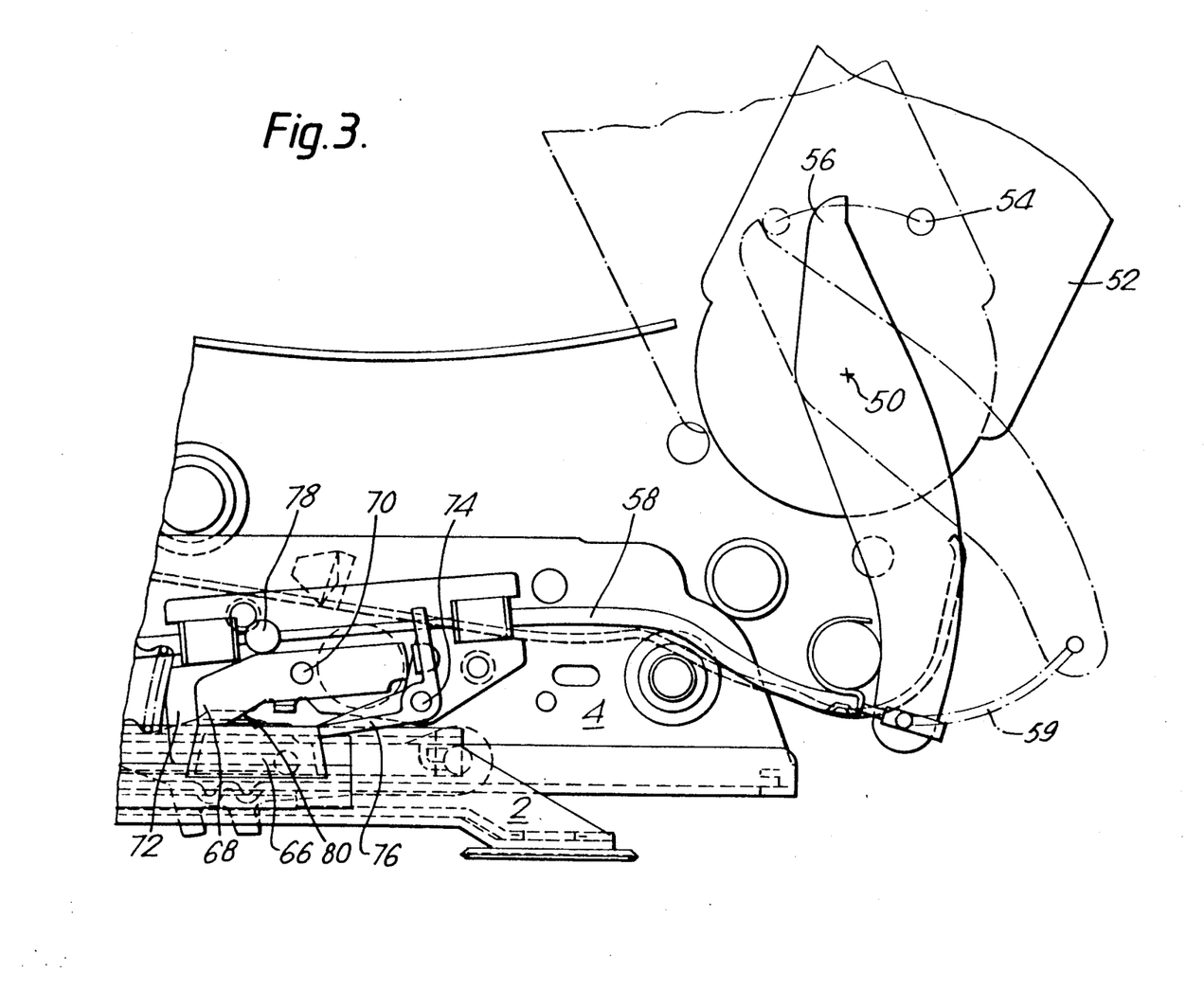
FIG. 3 is an enlarged view of that portion of FIG. 2 which includes the seat position memory system.

The vehicle seat slide pair of the first embodiment shown in FIGS. 1, 2 and 3 comprises a fixed elongate slide 2 which, in use, is fixed to the floor of a vehicle and an elongate movable slide 4 which, in use, is fixed to the body 5 of a vehicle seat. The stationary slide 2 is of generally conventional construction and is of channel shape with a base 6, two side walls 8 and two upper inwardly extending portions 10 which define a central elongate slot. The base 6 has a series of apertures 12 formed in it or notches or detents formed on it which are positioned at a regular spacing whose function will be described below. The movable slide is of generally inverted T-shape whose head is slidably received within the fixed slide and whose stem extends upwardly through the slot defined by the portions 10 of the fixed slide. The movable slide is slidably supported within the stationary slide by rollers 11 which run between the head of the T and the base of the fixed slide. The slide pair is pre-loaded to prevent rattling by ball bearings 13 which are positioned in races defined generally between the head of the T and the upper portions 10 of the fixed slide.

Situated within the fixed slide and pivotally connected to the movable slide by a pivot pin 14 is a trigger or locking member 16 which extends forwardly from the pivot pin 14 and terminates in two downwardly and slightly rearwardly extending locking teeth 18. These teeth are spaced apart by the same distance centre to centre as the apertures 12 and normally engage into two adjacent apertures, as shown in FIG. 1, to prevent relative sliding movement of the two slides. The trigger member 16 is biased downwardly into the locked position by a powerful spring 17.

Pivotally connected to the body 5 of the seat by means of a pivot pin 20 is a release member 24 which is secured to a handle portion 22 extending forwardly from the pivotal axis, the release member 24 extending generally downwardly. The handle portion 22 and the release member 24, are pivotally movable together between a locked position, shown in solid lines, and an unlocked position, shown in chain lines. In practice, the handle portions 22, one for each slide pair will constitute the two side limbs of a generally U-shaped release handle, the base limb (not shown) extending across the width of the seat, so that movement of the handle causes the two release members to move simultaneously.

Pivotally connected within the movable slide by means of a pivot pin 28 is a generally L-shaped intermediate member 30, one of the limbs of which cooperates with the underside of the trigger member 16 and the other limb of which is connected to a metallic cable 31 by means of a peg 32 which extends out through an arcuate slot 34 in the side wall of the movable slide 4. The cable 31 is contained over most of its length within sheathing 36 which terminates at one end in a terminal block 38 located in an aperture in the movable slide 4 and terminates at the other end adjacent the actuating portion of the release member 24. At this other end the cable ends in a ball 40 connected to move with the actuating portion 24.

In use, if it is required to alter the longitudinal position of the seat the handle portion 22 is pulled upwards out of the locked position shown in solid lines into the unlocked position. This results in clockwise rotation of the release member 24 about the pivot 20 and thus in the cable 31 being drawn to the left, as seen in FIG. 1. This results in turn in anticlockwise rotation of the intermediate member 30 which bears against the underside of the trigger member 16 and moves it from the illustrated locked position into the unlocked position in which the teeth 18 no longer engage with the apertures 12. The seat is now moved to the desired position and the handle portion is released whereafter it returns to the locked position under the action of a return spring (not shown) acting on it or the intermediate member 30. The trigger member 16 returns to the locked position also under the action of the spring 17 if the teeth 18 are in registry with apertures 12. However, if the teeth are not in registry with apertures they will be pressed into engagement with the base of the fixed slide between pairs of apertures. If this should occur the trigger member will generally engage in two apertures 12 under the action of the spring 17 when the seat is moved slightly forwards or backwards as a result of movement of the person sitting on it. In this event, the trigger member 16 moves independently of and relative to the intermediate member 30 under the action of its return spring 17. If the vehicle should be involved in a head-on collision before the trigger member 16 has become engaged with the apertures 12 the seat will begin to move rapidly forwards. However, as soon as the teeth 18 are in registry with two apertures the trigger member 16 is moved extremely rapidly downwardly under the action of the spring 17 thereby engaging the teeth with the apertures and arresting any further movement of the seat before any appreciable velocity has been attained. Due to the fact that during such downward movement the trigger member is decoupled from the intermediate member 30, and more importantly, from the release member 24 and the handle portion 22 secured thereto, the mass to be moved by the spring is relatively small and by providing a spring of sufficient strength it can be ensured that the trigger member engages with apertures 12 extremely rapidly. If the vehicle should be involved in a collision the fixed slide may be subjected to deformation and if this deformation should be downwardly the spring 17 will tend to urge the trigger member 16 to follow it to minimise the risk of the two slides becoming disconnected.

As mentioned above, the handle portion 22 and release member 24 is pivotally connected to the body 5 of the seat and not to the movable slide, as is usual. The pivotal connection is by way of two laterally spaced connection members 41, one on each side of the seat, each of which member is snap fitted to two bosses or other protrusions 42 forming part of the seat frame. The handle portion and release member is pivotally connected to the connection members 41 by inserting a pivot pin 20 before or after snap fitting to the bosses. After engaging the cable end balls 40 in corresponding recesses in the release members 24 the connection is complete. If the vehicle is involved in a collision the floor may become distorted and the relative vertical position of the slide pairs altered. However, due to the fact that the release member is connected to the seat frame it is partially isolated from this distortion and this fact in conjunction with the fact that the release member cooperates with the trigger members via cables which are inherently flexible and readily permit relative lateral movement means that distortion of the vehicle floor does not result in the inadvertent release of one or both trigger members.

Pivotally connected to the rear of the seat frame 5 about a pivotal axis 50 is a seat rear or squab 52 which may be tilted between a use position shown in solid lines and a forward position shown in chain lines. Connected to the squab is a drive pin 54 which is positioned so that when the squab is tilted forward it engages the upper end of a release arm 56, which is also pivotally mounted about the axis 50, and rotates it into the position shown in chain lines. Connected to the lower end of the release arm 56 is one end of a stranded metal cable 59 which extends forwardly through a sheath 58. The other end of the cable passes around a pulley 60 and is then fixedly connected to the movable slide 4 at an anchorage 62. The pulley 60 is rotatably mounted on an arm 63 which is integral with the release member 22 and thus rotates with it about the pivot 20.

Connected to the fixed slide 2 of one of the slide pairs of the seat slide mechanism is a longitudinally extending memory rail 64 on which a memory block 66 is a frictional sliding fit. The flat upper surface of the memory block 66 is normally engaged by the foot of a trip pawl 68 which is pivotally mounted about an axis 70 on a trip mechanism plate 72 which is mounted parallel to and inwardly of the movable slide 4. The front surface of the memory block 66 is engaged by a depending portion of the plate 72. Pivotally mounted on the trip mechanism plate 72 about an axis 74 is an L-shaped memory positioner 76, having an upstanding arm and a forwardly-projecting lower arm which normally engages the rear surface of the memory block 66, as seen in the Figures.

The cable 59 is sheathed over most of its length but has a bare portion 62 which extends above the trip pawl 68, passes through a groove 63 at the end of the upstanding arm of the memory positioner 76 and carries an actuating portion comprising a ball or other protrusion 78. In normal use, when the seat is slid forwardly or rearwardly the memory block 66 is moved with it by engagement with the memory positioner 76 or the trip mechanism plate 72.

If the seat is to be moved and tilted forwardly, e.g. to permit easy access to the rear of the vehicle in the case of a two-door car, the conventional lever or the like (not shown) for releasing the squab 52 is actuated and the squab is then tilted fully forwards. As this occurs the drive pin 54 rotates the release arm 56 thereby drawing the cable 59 rearwardly. This acts on the pulley 60, the principal purpose of which is to provide a mechanical advantage, and rotates the arm 63 and thus the handle portion 22 and release member 24. This results in the simultaneous release of the two trigger members 16, one on each side of the seat, by way of the cables 36. The seat is then slid into the fully foward position, either manually or by the springs (not shown) which are commonly provided for this purpose. As the cable 59 is moved, the ball 78 on it engages the upstanding arm of the memory positioner 76 and rotates it clockwise, as seen in FIGS. 1 and 3, so that the lower arm moves clear of the memory block 66. As the seat moves forwardly the memory positioner 76 moves over the memory block 66, which thus remains stationary on the memory rail 64, and the trip pawl 68 rotates slightly anti-clockwise. When the seat is to be returned to its original position, the squab is tilted rearwardly and the return spring acting on the release member 22 attempts to move the cable 59 to the left. However, this is prevented by the right hand end of the trip pawl 68 which has pivoted into a position in which it is engaged by the ball 78 as soon as the cable 59 starts to move. However, as the seat is slid rearwardly, when a ramped surface 80 on the underside of the front end of the trip pawl 68 engages the inclined front surface of the memory block 66, it is rotated clockwise and its lower surface rides up onto the upper surface of the memory block, i.e. it re-adopts the position shown in FIGS. 1 and 3. As it does so the ball 78 is no longer obstructed by the trip pawl 68 and the cable 59 thus moves rapidly to the right. The release member 24 therefore moves rapidly to the locked position and the trigger members 16 engage in apertures 12 and the seat is automatically locked in the position which it originally occupied. The memory positioner 76 then returns to its original position under the action of gravity or a return spring (not shown) and if the seat is subsequently slid back or forward without tilting the squab the memory block 66 is moved with it forwardly and rearwardly by engagement by the trip mechanism plate 72 and the memory positioner 76, respectively.

The vehicle seat slide pair of the second embodiment of the invention, shown in FIGS. 4–7 comprises a fixed elongate slide 102 which, in use, is fixed to the floor of the vehicle by means of a front end bracket 103 and a rear end bracket 105, and an elongated movable slide 108 which, in use, carries the body of the seat on a frame 110. The particular form of slide is not relevant to this embodiment, is not shown in the drawings and will not be described in detail, but briefly, the movable slide moves relative to the fixed slide on ball bearings (not shown) in suitable races. The fixed slide 102 has a side flange 104 extending along most of its length and is provided with a plurality of rectangular apertures 112 regularly spaced-apart along the length of the flange in a straight line. The function of the apertures will be described below.

Figure 4:
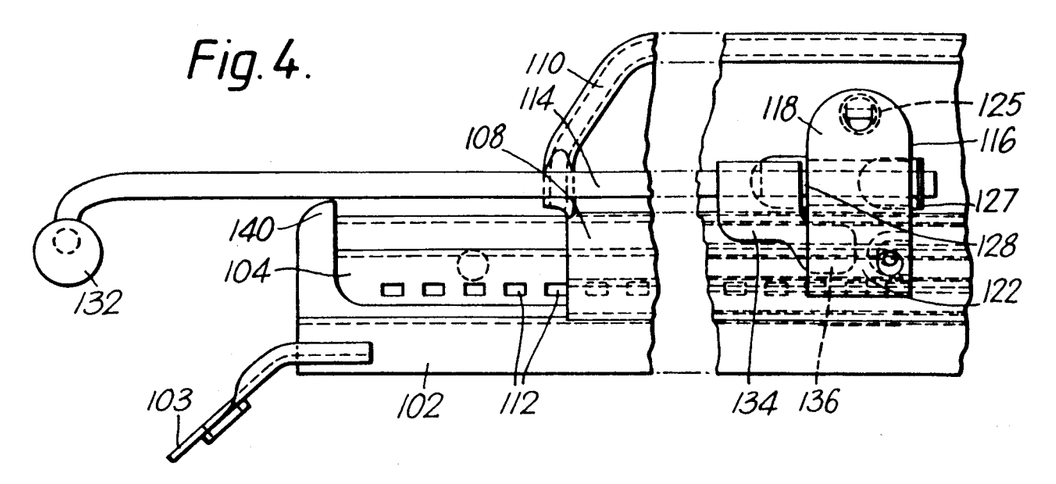
FIG. 4 is a partial side view of the front part of a slide pair forming part of a vehicle seat slide mechanism in accordance with the second embodiment of the invention, the memory unit being omitted for clarity.
Figure 5:
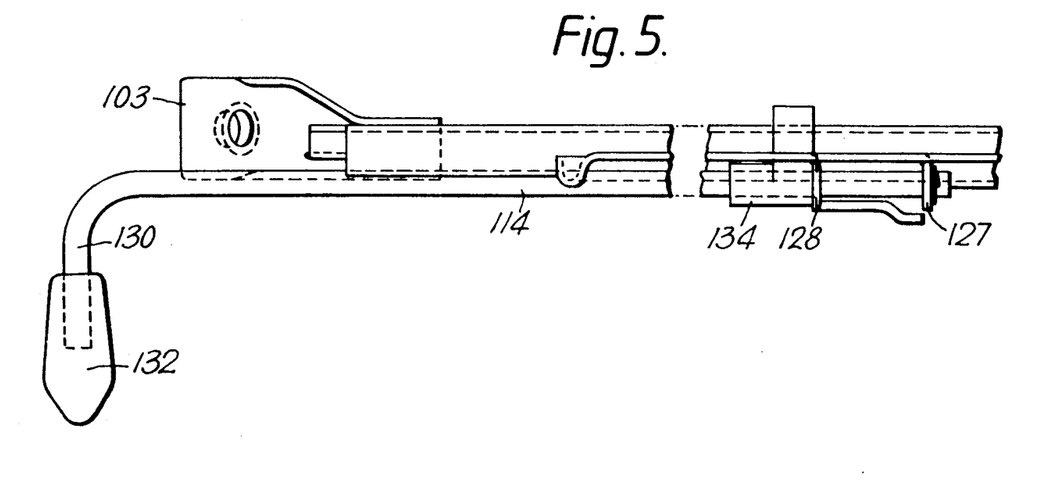
FIG. 5 is a top plan view on Arrow C of FIG. 4.
Figure 6:
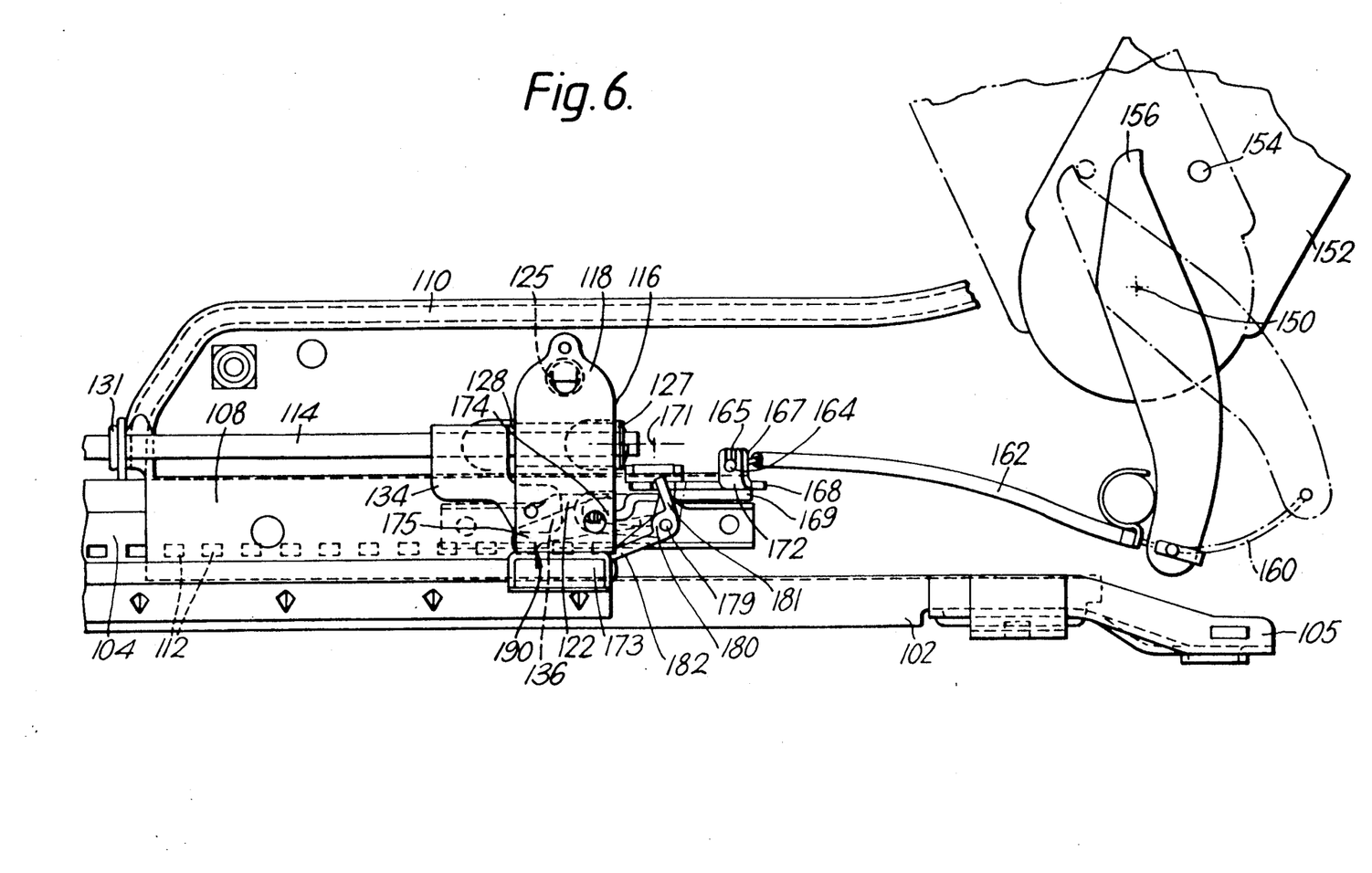
FIG. 6 is a partial side view of the rear part of the slide pair shown in FIG. 4.

Pivotally mounted on the movable slide 108 by means of a circular cross-section shank 114 which extends generally horizontally and generally parallel to the slide is a trigger or locking member 116, comprising a metal plate and having an upper portion 118 which is generally semi-circular in the side view as shown in FIGS. 4 and 6, a central curved portion 120 defining a channel for receiving the shank 114 as will be described below and a lower portion 122 formed with two spaced-apart teeth 124. A powerful spring 125 is located between the upper portion 118 and the movable slide 108 to bias the lower portion 122 against the flange 104 in the fixed slide 102 and in particular to engage the teeth 124 (which pass through openings in the movable slide) on two adjacent apertures 112 in the flange 104 and thus prevent unwanted fore-and-aft movement of the movable slide 108 relative to the fixed slide 102. The trigger member 116 is not fixed to the shank 114 but is capable of pivotal movement thereon, the curved portion 120 (in the form of a channel and having an interior surface corresponding to part of the shank surface) being freely engaged therewith.

The shank 114 extends part-way along the length of the slide pair generally parallel thereto and is held adjacent the trigger member 116 on two spaced-apart brackets 127 and 128 on the movable slide and at the end further from the trigger member is cranked to form a handle 130 extending approximately at right-angles to the length of the shank. A collar 131 is provided on the shank at the front of the frame to limit the movement of the seat with respect to the lower slide. The two brackets 127 and 128 are positioned one on each side of the trigger member 116 and act as locators to prevent longitudinal movement of the shaft relative to the movable slide 108. The handle, carrying a gripping knob 132, is located underneath the front edge of the seat carried by the movable slide. Attached, e.g. welded, to the shank so as to rotate therewith is a release member 134, which is located generally alongside the trigger member, and has a tongue 136 which is located between the lower portion 122 of the trigger member 116 and the movable slide 108.

Figure 7:
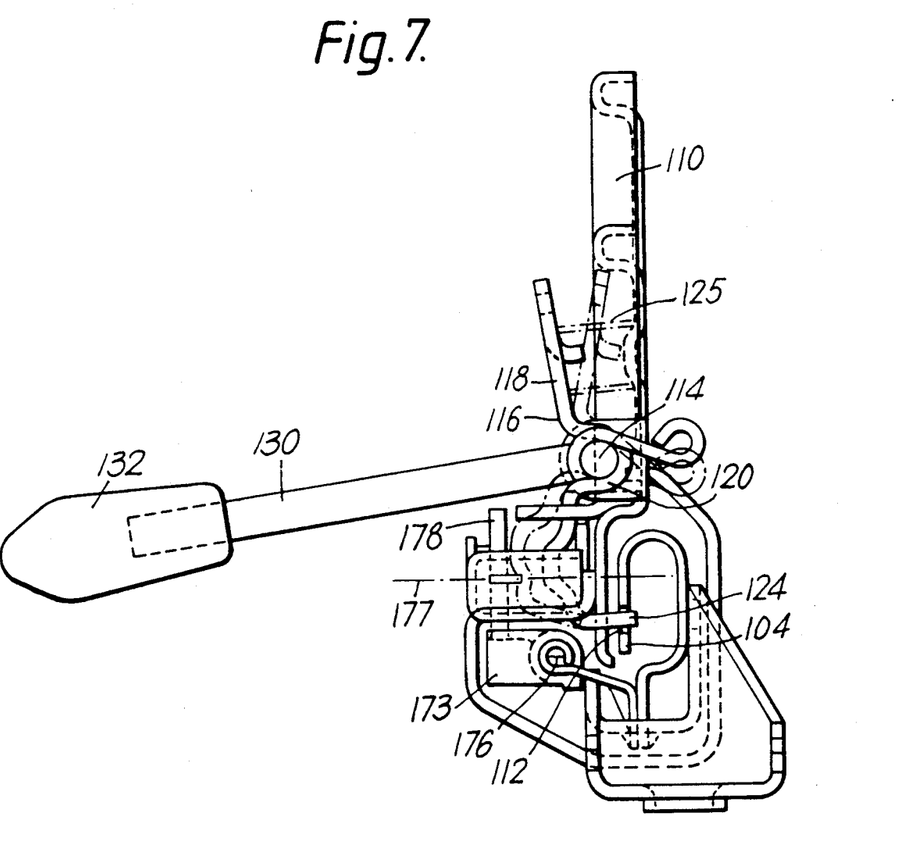
FIG. 7 is a transverse sectional view of the slide pair shown on FIG. 4.

In use, when a person wishes to move the seat forwards or backwards, the person grips the knob 132 and raises the handle 130 thus rotating the shank 114 about its longitudinal axis. The release member 134 is also rotated and the tongue 136 is pressed against the adjacent side of the lower portion 122 of the trigger member 116 causing it to rotate in a clockwise direction as shown in FIG. 7 against the biassing action of the spring to the position shown in chain-dotted outline in FIG. 7 with the teeth 124 disengaged from the apertures 112 in the flange 104 in the lower, fixed slide.

The seat on the movable slide 108 is then moved forwardly or rearwardly as required and the handle 130 lowered. The forward movement is limited by the collar 131 engaging on an upstanding part 140 of the lower, fixed slide. Lowering the handle causes the shank 114 and the release member 134 thereon to rotate in an anti-clockwise direction as shown in FIG. 7. The trigger member 116 also rotates in the same direction under the influence of the spring 125 and if the teeth 124 are in registry with a pair of apertures 112 they enter and engage them. If however, the teeth are not in registry they bear against the flange 104 at positions between the apertures 112, the tongue 136 moving out of contact with the lower portion 122 of the trigger member 116 and into contact with the movable slide 108 under the weight of the handle 130 and knob 132, or a return spring (not shown). When the seat is moved forwardly or backwardly as a result of movement of the person sitting thereon, the pair of teeth 124 move into registry with a pair of apertures 112 and the trigger member 116 rotates in an anti-clockwise direction about the shank 114 under the influence of the spring 125 to move the teeth 124 into engagement with the apertures 112. If the vehicle should be involved in a head-on collision before the teeth 124 of the trigger member 116 have become engaged with a pair of apertures 112 the seat and movable slide will begin to move rapidly forwards. However as soon as the teeth 124 are in registry with a pair of apertures 112 the trigger member 116 is rotated rapidly under the influence of the spring 125 thereby moving the teeth 124 into locking engagement with a pair of apertures 112 and arresting any further movement of the seat before any appreciable velocity has been attained. Due to the fact that during such rotational movement the trigger member 116 is decoupled from the release member 134 and the shank 114 and handle 130, the mass to be moved by the spring is relatively small and by providing a spring of sufficient strength it can be ensured that the teeth 124 engage a pair of apertures 112 extremely rapidly.

The upper portion 118 of the trigger member 116 as shown in the drawings may be linked by means of a cable or light rod extending transversely underneath the seat to the upper portion of a similar trigger member and associated spring located on a seat slide pair on the other side of the seat. However, the trigger member is constructed to rotate on a short pivot rod between two brackets similar to the two brackets 127 and 128, rather than on the long shank with attached handle. No release member is provided.

In use when the handle is raised the trigger member 116 rotates as described above, and because of the cable or rod connection, the trigger member on the other seat slide pair also rotates, thus disengaging its teeth from associated apertures. When the handle is lowered the two trigger members are then free to rotate in the opposite direction and, if each set of teeth is in registry with a pair of apertures, the two trigger members return to their locked position under the influence of their respective springs. If however, the teeth of the trigger members are not in registry with pairs of apertures, they engage the side surfaces of the flanges of the fixed slides until such time as the movable slide is moved forwardly or rearwardly by the person sitting on the seat. If the vehicle is involved in a head-on collision the seat and movable slides move rapidly forwards, and as soon as the teeth on each trigger member are in registry with pairs of apertures the trigger members are rotated rapidly under the influence of the springs thereby moving the teeth into locking engagement with pairs of apertures, one pair on each slide pair, and arresting any further movement of the seat before any appreciable velocity has been attained. Due to the fact that during such rotational movement of the trigger members they are decoupled from the release member and the shank and handle, the mass to be moved by each spring, one on each slide pair, is relatively small, and by providing springs of sufficient strength it can be ensured that the teeth of each trigger member engage a pair of apertures extremely rapidly.

Pivotally connected to the rear of the seat frame 110 about a pivotal axis 150 is a seat rear or squab 152 which may be tilted between a use position shown in solid lines and a forward position shown in chain lines. Connected to the squab is a drive pin 154 which is positioned so that when the squab is tilted forwards it engages the upper end of a release arm 156, which is also pivotally mounted about the axis 150, and rotates it into the position shown in chain lines. Connected to the lower end of the release arm 156 is one end of a stranded metal cable 160 which extends forwardly through a sheath 162. The other end of the cable ends in a ball 164 and is secured in a notch 165 in an upstanding bracket 167 formed on the upper of two horizontal plates 168, 169 each mounted to rotate separately about a vertical axis 171. At its rear end the lower plate 169 has a small upstanding flange 172 which engages a side of the upper plate 168 and at its front end the lower plate has a surface 174 for engaging the inner surface of the lower portion of the trigger member 116. This lower plate acts as another release member in a manner to be described below.

Connected to the fixed slide 102 of the slide pair having the handle attached thereto is a longitudinally extending memory rail 176 in which a memory block 173 is a frictional sliding fit. The flat upper surface of the memory block is normally engaged by the trip pawl 175 which is pivotally mounted about an axis 177 on a trip mechanism plate 178 which is mounted parallel to and inwardly of the movable slide 104. The front surface of the memory block 173 is engaged by a depending portion of the trip mechanism plate 178. Pivotally mounted on the trip mechanism plate 178 about a horizontal axis 179 is an L-shaped memory positioner 180, having an upstanding arm 181 and a forwardly-projecting lower arm 182 which normally engages the rear surface of the memory block as can be seen in FIG. 6. The construction and arrangement of the memory rail 176, memory block 173, trip pawl 175, trip mechanism plate 178 and memory positioner 180 is the same as for the first embodiment shown in FIGS. 1–3 but in this second embodiment the upstanding arm 181 of the memory positioner 180 and the trip pawl 175 co-operatively engage the horizontal plates 168 and 169.

In use, if the seat is to be moved and tilted forwardly, e.g. to permit easy access to the rear of the vehicle in the case of a two-door car, the conventional catch or the like (not shown) for releasing the squab 152 is actuated and the squab is then tilted fully forwards. As this occurs the drive pin 154 rotates the release arm 156 thereby drawing the cable 160 rearwardly. This acts on the upper horizontal plate 168 causing it to rotate about its vertical axis and at the same time engage the small upstanding flange 172 on the lower plate 169 so that it rotates simultaneously and acts as another release member, the surface at the front end of this lower plate being pushed against the lower portion 122 of the trigger member 116, so causing it to rotate against the action of the spring 125. The teeth 124 are thus disengaged from the pair of apertures 112 in which they were located allowing the seat to move forwards. On rotation the upper horizontal plate 168 also engages the upstanding arm 181 of the memory positioner 180 and rotates it clockwise, as shown in FIGS. 6 and 7 so that the lower arm moves clear of the memory block 17. As the seat moves forwards the memory positioner 180 moves over the memory block 173, which thus remains stationery on the memory rail 176, and the trip pawl 175 rotates slightly anti-clockwise.

When the seat is to be returned to its original position, the squab 152 is tilted rearwardly and the cable tries to move to the left as shown in FIG. 6 under the influence of the spring 125 acting on the trigger member 116 which in turn acts on the lower and upper horizontal plates 168, 169. However this is prevented by the right hand end of the trip pawl 175 which has pivoted into a position where it engages the two horizontal plates 168 and 169 as soon as the cable 160 starts to move. However as soon as the seat is slid rearwardly, when a ramped surface 190 on the underside of the front end of the trip pawl 175 engages the inclined front surface of the memory block 173, it is rotated clockwise and its lower surface rides up onto the upper surface of the memory block i.e. it re-adopts the position shown in FIG. 6 and 7. As it does so the horizontal plates 168, 169 are no longer obstructed by the trip pawl and the cable thus moves rapidly to the right. The lower horizontal plate no longer engages the trigger member so the teeth thereon engage in the pair of apertures and the seat is automatically locked in the position it originally occupied. The flange 172 on the lower horizontal plate 169, engages the edge of the upper horizontal plate 168 so it also returns to its original position The memory positioner 180 then returns to its original position by movement of the horizontal plates and if the seat is subsequently slid backwards or forwards without tilting the squab the memory block 173 is moved with it, backwards or forwards, by engagement by the trip mechanism plate and the memory positioner respectively.

Whilst the constructions described above utilise flexible cables to connect the release member 24 with the trigger members 16 and also the seat squab 52 with the trigger members this is not essential. In an alternative construction, which is not illustrated, each trigger member is associated with an actuating member which is mounted to rotate about a vertical axis. Connected to each actuating member is a lateral inclined lug or plate which co-operates with a ramped surface on the associated trigger member such that when the actuating member is rotated the trigger member is moved from the locked to the unlocked position. Projecting from each actuating member is a further lateral actuating lug. The actuating lug of one actuating member is connected to a rotary release member and the actuating lug of the actuating member is connected by means of a cable, rod or the like to a further lug projecting from the first actuating member. Rotation of the release member results in rotation of the first actuating member which in turn rotates the second actuating member via the cable, rod or the like whereby both trigger members are unlocked simultaneously. When the release member is released it returns to the locked position under the action of its return spring and the trigger members also return to the locked position under the action of their return springs, if this is possible. However, if the teeth on the trigger members are not in registry with apertures in the fixed slide they will be rapidly returned to the locked position on the next occasion that their teeth are so in registry.

Each actuating member also carries a further lateral release lug and that on the first actuating member is connected by means of a substantially rigid bar or spoke to the seat squab or a member connected to move therewith such that as the squab is tilted forwardly its motion is transmitted by the bar or spoke to the first actuating member which is rotated into the unlocked position. This rotation is transmitted by the cable, rod or the like to the second actuating member whereby forward tilting movement of the squab results in the simultaneous release of both trigger members. The bar or spoke is connected to the squab by a lost motion connection whereby when the trigger members are unlocked by rotation of the release member the rigid bar or spoke can move rearwardly with respect to the squab.

The seat memory system is substantially the same as in the first embodiment but the function of the ball 78 in the cable 58 is fulfilled in this case by a member, e.g. the release lug, connected to move with the actuating member of the first trigger. This member is positioned to rotate the memory positioner 76, when the squab is tilted forwardly, in a manner analogous to that of the ball 78.

What I claim is:

1. A vehicle seat slide mechanism comprising:
   two seat slide pairs, each comprising a first elongate slide member adapted to be connected to the floor of the vehicle and a second elongate slide member adapted to be connected to the body of the vehicle seat and in sliding relationship with the first member;
   a trigger member mounted on each said second slide member and normally urged by a spring into a locked position where it is in engagement with at least one of a series of apertures or notches in the first slide member to prevent relative sliding movement of the two slide members;
   a release member co-operating with each of the two trigger members and arranged to move each of the two trigger members from the locked position to an unlocked position where each is out of engagement with the at least one aperture or notch in the first slide member;

a memory member carried by the first slide member and moveable parallel thereto;

first and second engagement members carried by the second slide member and engageable with the memory member to effect movement thereof parallel to the first slide member;

a coupling member linked to the release member;

a forwardly tiltable lever to which the coupling member is linked and which, when tilted forwardly operates the release members through the coupling members to move the trigger members to the unlocked position;

an actuator associated with the coupling member which co-operates with the first engagement member on said forward tilting of the lever to move the first engagement member out of engagement with the memory member which thus remains stationary as the seat is moved forwardly; and a locking member which co-operates with the memory member and is so constructed and arranged that when the seat is moved forwardly and the memory member remains stationary, the locking member moves to a position where it co-operates with the actuator whereby when the lever is returned to its untilted position the coupling member is prevented from returning to a position in which each trigger member may return to the locked position, but when the seat is moved rearwardly the locking member engages the memory member and returns to its original position thereby permitting the coupling member to return to its original position whereafter each trigger member returns to the locked position thus locking the seat in its original position.

2. A vehicle seat slide mechanism according to claim 1 wherein when the lever is returned to its untilted position and the seat is moved rearwardly the second engagement member also returns to its original position in engagement with the memory member.

3. A vehicle seat slide mechanism according to claim 1 wherein the lever comprises the seat squab.

4. A vehicle seat slide mechanism according to claim 1 wherein said memory member comprises a block frictionally engaged with a rail arranged parallel to the first slide member.

5. A vehicle seat slide mechanism according to claim 1 wherein the coupling member comprises a flexible cable having one end attached to the tiltable lever.

6. A vehicle seat slide mechanism according to claim 5 wherein the cable passes round a pulley connected to the release member and has its other end attached to the second slide member.

7. A vehicle seat slide mechanism according to claim 5 wherein the actuator comprises a ball or other projection connected to the cable.

8. A vehicle seat slide mechanism according to claim 1 wherein the release member co-operates with the trigger member via an intermediate member.

* * * * *